US005428825A

United States Patent [19]

Tomohiro et al.

[11] Patent Number: 5,428,825

[45] Date of Patent: Jun. 27, 1995

[54] METHOD OF SELECTING RECEIVING FREQUENCY FOR RDS RECEIVER

[75] Inventors: Ryou Tomohiro; Hiromu Annoi, both of Hyogo, Japan

[73] Assignee: Mitsubishi Denki Kabushiki Kaisha, Tokyo, Japan

[21] Appl. No.: 202,679

[22] Filed: Feb. 25, 1994

Related U.S. Application Data

[63] Continuation of Ser. No. 739,457, Aug. 2, 1991, abandoned.

[30] Foreign Application Priority Data

Sep. 14, 1990 [JP] Japan .............................. 2-244523

[51] Int. Cl.$^{6}$ .............................................. H04B 1/16

[52] U.S. Cl. .............................. 455/186.1; 455/152.1; 455/161.3

[58] Field of Search ................. 455/38.1, 152.1, 161.2, 455/161.3, 185.1, 186.1, 186.2, 345, 33.1, 33.4

[56] References Cited

FOREIGN PATENT DOCUMENTS 0211366 7/1986 European Pat. Off. .
0333194 3/1989 European Pat. Off. .
3197236 5/1989 Germany .
0136830 6/1988 Japan ................................ 455/185.1
0160220 6/1989 Japan ................................ 455/185.1
0021732 1/1990 Japan ................................ 455/185.1
2-104133 4/1990 Japan .

*Primary Examiner*—Reinhard J. Eisenzopf
*Assistant Examiner*—Chi H. Pham

[57] ABSTRACT

A receiving frequency selecting method for a vehicle-mounted RDS receiver, wherein a list of alternative frequencies being transmitted by former broadcasting stations are stored in a memory, and the RDS receiver chases the same broadcast program based on the stored list of alternative frequencies whenever the motor vehicle returns to the same broadcasting service area of the network wherein the stored list of alternative frequencies is effective for use. Further, the stored list of alternative frequencies data relating to frequencies of the received broadcast waves during the operation of chasing the same radio program are also utilized together with the stored list of alternative frequencies transmitted by the broadcasting stations for chasing the same broadcast program.

16 Claims, 7 Drawing Sheets

FIG. 7A

| FREQUENCY DATA STORAGE AREA | OLD/NEW COUNTER AREA |
|---|---|
| $f_B$ | 0 |
| $f_C$ | 1 |
| $f_Z$ | 3 |
| $f_X$ | 2 |
| $f_A$ | 2 |
| $f_D$ | 0 |
| $f_E$ | 1 |
| $f_Y$ | 3 |
| $f_V$ | 0 |
| $f_W$ | 0 |
| . | . |
| . | . |
| . | . |

11a

FIG. 7B

| FREQUENCY DATA STORAGE AREA |
|---|
| $f_D$ |
| $f_C$ |
| $f_B$ |
| $f_A$ |
| . |
| . |
| . |
| . |
| . |
| . |

11b

METHOD OF SELECTING RECEIVING FREQUENCY FOR RDS RECEIVER

This application is a continuation, of application Ser. No. 07/739,457 filed on Aug. 2, 1991, now abandoned.

BACKGROUND OF THE INVENTION

1. Field of the Invention

This invention relates to a method of selecting receiving frequency and, more particularly, to a method of selecting a receiving frequency for a radio data system receiver.

2. Description of the Prior Art

As a well known radio service, a radio data system (hereinafter referred to as RDS) is common in Europe for providing a radio service for broadcast wave listeners. In such RDS, informative data relating to broadcast programs are transmitted simultaneously with the broadcast programs in a multiplex modulation from broadcasting stations and, upon receiving the broadcast waves, a desired broadcast program is selected by the broadcast wave listener based on demodulated data.

The RDS is a data system standardized in the Europe Broadcasting Union (EBU), wherein the data relating to the broadcast such as broadcast programs and the like are coded into a two phase Differential Phase Shift Keying (DPSK) signal having a bit rate of 1187.5 bps, and these coded data are broadcasted by frequency-modulating a sub-carrier in such that modulating a 57 KHz sub-carrier in accordance with a double-sideband carrier suppression amplitude modulation.

In the RDS, as shown in FIG. 1, the whole data are transmitted as a unit which is called a group consisting of 104 bits. One group in turn consists of four blocks and each of which consists of 26 bits. Each block consists of 26 bits wherein 16-bit information is coded into an abbreviated cyclic code and then 10-bit offset word that corresponds to the same portion within the four blocks is added thereto. This offset word provides synchronization among the group structure at the time of receiving the data. The data contained in each group are prescribed depending on their locations, whereby 16 bits of the first block always designate a program identification code (PI code), while in the second block, first 5 bits designate a group-type code, the next one bit designates a traffic-program identification code (TP code), and the next succeeding 5 bits designate a program type code (PTY code).

Further, the contents of the remaining bits in the second block as well as data contained in the third and fourth blocks are determined respectively for every type of group. The group-type can be distinguished from each other by 5-bit information in total, in which the first 4 bits can provide 16 different types of 0–15 and, then, the remaining one bit provides two versions of A and B for the 16 different types of 0–15, respectively.

For example, in an OA group shown in FIG. 2, a traffic announcement identification code (TA code) is allocated in the second block, a list of alternative frequencies data (AF data) for identifying broadcasting network stations which broadcast the same program are allocated in the third block, and that program service name data (PS data) for providing a broadcast information service such as names of broadcasting stations, names of broadcasting networks and the like in the fourth block.

In a motor vehicle-mounted RDS receiver, quite often poor reception is encountered while listening to broadcast wave during a motor vehicle travel. However, in the RDS broadcast, since the AF data of the broadcasting stations within the same broadcasting network, which stations are broadcasting the same broadcast program on different frequencies, are available as described above, it is possible to select another broadcasting station in the same broadcasting network having a stronger electric field strength, or a greater signal level, than that of the broadcasting station presently tuned in based on the AF data stored in a memory for chasing the same broadcast program.

In FIG. 3, for example, broadcasting stations A, B, C, D and E form a group of broadcasting stations that belongs to the same broadcasting network. Within the same broadcasting network, all broadcasting stations broadcast the same broadcast program but on different frequencies based on corresponding AF data $f_A$, $f_B$, $f_C$, $f_D$ and $f_E$, respectively. It is assumed that each broadcasting station transmits the AF data, which represent frequencies data of neighboring broadcasting stations, in such a way as shown in the following table 1.

TABLE 1

| | Station A | Station B | Station C | Station D | Station E |
|---|---|---|---|---|---|
| AF DATA | $f_B$ | $f_A$ | $f_A$ | $f_C$ | $f_B$ |
| | $f_C$ | $f_C$ | $f_B$ | $f_E$ | $f_D$ |
| | $f_Z$ | $f_D$ | $f_D$ | $f_V$ | $f_V$ |
| | $f_X$ | $f_E$ | $f_X$ | $f_W$ | $f_W$ |
| | | $f_Z$ | | $f_B$ | |
| | | $f_Y$ | | | |

Firstly, when the motor vehicle driver selects the broadcasting station A by operating a tuner of the vehicle-mounted RDS receiver for receiving a desired broadcast program. Secondly, when the motor vehicle leaves a service area of the broadcasting station A and enters the service area of the broadcasting station B. It is possible to switch the receiving frequency of the vehicle-mounted RDS receiver from that of the broadcasting station A to B based on the AF data ($f_B$, $f_C$, $f_Z$, $f_X$) transmitted by the broadcasting station A since the AF data $f_B$ designates that the same broadcast program is available on a corresponding broadcast frequency of the broadcasting station B. Similarly, if the motor vehicle travels along, for example, a route (via the broadcasting stations A-B-C-D-E) passing through the respective broadcasting service areas as shown in FIG. 3, the vehicle-mounted RDS receiver can receive broadcast waves successively, after leaving the service area of the broadcasting station A, via the broadcasting stations B, C, D and, then finally, E, thus providing the motor vehicle-mounted RDS receiver with good reception of the desired broadcast program.

The receiving frequency selecting method of the prior-art-type RDS receiver has been described hereinabove. In such an RDS receiver, after the reception of the broadcast wave is switched over in succession from the broadcasting station A to the broadcasting station E via the broadcasting stations B, C and D, if the motor vehicle travels around a mountainous district along a route, shown by a dotted line in FIG. 3, and returns to the service area of the broadcasting station A, whereas the motor vehicle once has left the broadcasting service area of the network and returned to the service area of the broadcasting station A again, the reacquisition of the same broadcast program becomes very hard to maintain unless the AF data for the broadcasting station A is included in the AF data group transmitted by the broadcasting station E.

It is therefore an object of this invention to eliminate the problems encountered by the prior-art-type RDS receiver and to provide a new receiving frequency selecting method for a RDS receiver wherein it is assured for a motor vehicle driver to resume the same broadcast program in case that the motor vehicle, after it once has left a service area of a broadcasting network, returns back to the service area of the broadcasting network, within which the same broadcast program has been received from a plurality of broadcasting stations, or to a broadcasting service area neighboring thereto.

SUMMARY OF THE INVENTION

In one aspect of the receiving frequency selecting method for the RDS receiver embodying the present invention, a list of alternative frequencies data being transmitted formerly by the broadcasting stations in contact are stored in a memory. This stored list of alternative frequencies data is then utilized in the next acquisition operation for the same broadcast program whenever the receiving frequency is varied during the operation of chasing the same broadcast program.

In another aspect of the receiving frequency selecting method for the RDS receiver embodying the present invention, the stored list of alternative frequencies data being transmitted formerly by the broadcasting stations in contact and stored data relating to frequencies of the received broadcast waves during the operation of reacquiring the same radio program are utilized simultaneously in a series of operations for acquiring the same broadcast program.

In the one aspect of the receiving frequency selecting method for the RDS receiver mentioned above, at least a part of the list of alternative frequencies information codes, which have been transmitted formerly by the broadcasting stations in contact, is stored in the memory. Accordingly, even if the motor vehicle has left the broadcasting service area of the broadcasting network, it is assured for the RDS receiver to initiate the operation for chasing the same broadcast program basing on the stored list of alternative frequencies data whenever the motor vehicle returns to the same broadcasting service area of the network wherein the stored list of alternative frequencies data are effective for use.

Further, in the another aspect of the receiving frequency selecting method for the RDS receiver, both the list of alternative frequencies data transmitted by the broadcasting stations in contact and another list of alternative frequencies data corresponding to the frequencies of received broadcast waves are stored during the operation for chasing the same broadcast program. Accordingly, even if the motor vehicle once has left the network service area, it is assured for the RDS receiver to initiate the operation for reacquiring the same broadcast program based on the stored list of alternative frequencies data whenever the motor vehicle returns to the broadcasting service area of the network wherein the stored list of alternative frequencies data is effective for use. Moreover, even if the memory overflows with the list of alternative frequency data and some of the stored list of alternative frequencies data have to be erased, this situation can be avoided by storing the list of alternative frequencies data corresponding to the frequencies of the received broadcast waves.

BRIEF DESCRIPTION OF THE DRAWINGS

FIGS. 7A and 7B are diagrams illustrating a state of stored AF codes in an AF memory and a true AF memory both of which constitute a part of a memory provided in the controller of the RDS receiver.

DETAILED DESCRIPTION OF THE PREFERRED EMBODIMENTS

Figure 4:
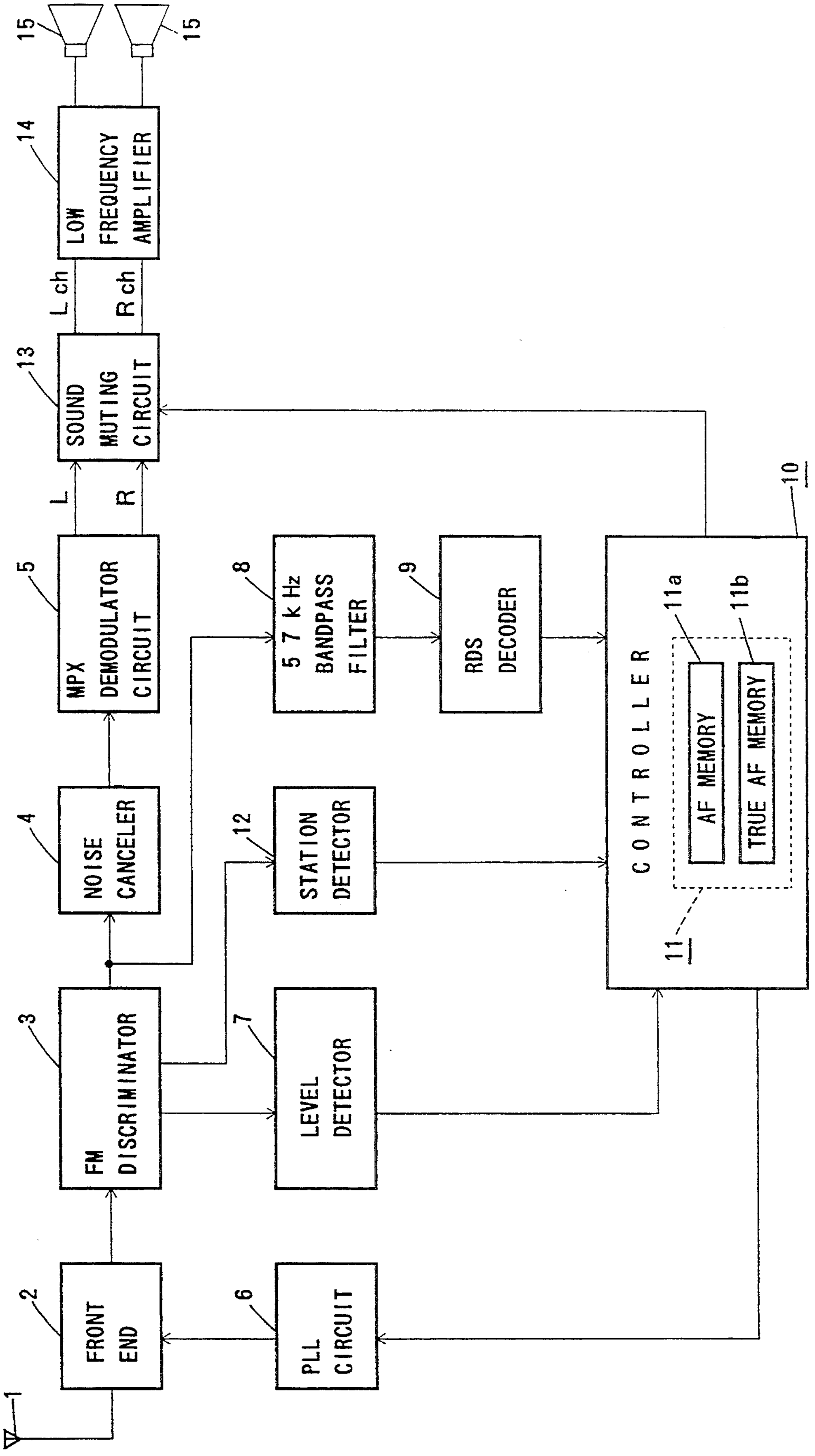
FIG. 4 is a block diagram showing a RDS receiver to implement a receiving frequency selecting method embodying the present invention.

Preferred embodiments of this invention will now be described in detail by referring to the accompanying drawings. Referring to FIG. 4, there is shown a RDS receiver for implementing the receiving frequency selecting method in accordance with the present invention.

In FIG. 4, FM multiplex broadcast waves received by an antenna 1 are fed to a front end 2 for selecting a desired broadcasting station, and thereby a broadcast wave of the selected broadcasting station is converted into an intermediate frequency (IF) and fed to a FM discriminator 3.

The front end 2 is under the control of a phase-locked loop (PLL) circuit 6 including a programmable frequency divider a dividing ratio of which is controlled by a controller 10, which will be described in detail hereinafter, for providing the tuning operation.

A discriminated output of the FM discriminator 3 is fed to a multiplex (MPX) demodulator circuit 5 through a noise canceler 4 for deriving a L (left) channel signal and a R (right) channel signal therefrom, in case of a stereophonic broadcasting, and fed to respective speakers 15 after passing through sound muting circuits 13 and low frequency amplifiers 14.

A RDS data signal is extracted from the discriminated output of the FM discriminator 3 by passing through a 57 KHz band-pass filter and fed to a RDS decoder 9. An output of the RDS decoder 9 is then fed to the controller 10 for converting it into a readable data. At the controller 10, obtained information of the broadcasting stations in contact (aforesaid data PI, AF, PS, TP, TA and the like) are stored in a memory 11.

A level detector 7 detects a received signal level (electric field strength level) based on the IF signal level fed from the FM discriminator 3. Further, a station detector 12 detects a broadcasting station and outputs a station detecting signal whenever an IF signal level exceeds a prescribed signal level and that an output discriminated by the S-curve characteristic of the FM discriminator 3 remains within a rage of prescribed levels.

In this way, the received signal level detected by the level detector 7 and the station detecting signal derived from the station detector 12 are fed to the controller 10.

Operational steps of the controller 10 will be described by referring to the flowcharts shown in FIGS. 5 and 6.

First, a method of registering AF data obtained from the broadcasting station presently in contact will be explained by referring to FIG. 5. It is assumed that, as shown hereinafter in FIG. 7A, AF data obtained from broadcasting stations in contact, at present as well as in the past, through the operation of chasing the same broadcast program are already stored in a frequency locator area within an AF memory 11*a* of the memory 11 and that old/new reception count values are in corresponding old/new reception counter area. In a memory map shown in FIG. 7A, $f_B$, $f_C$... $f_W$ designate a AF data list and the old/new reception count values illustrate the reception of the broadcast waves is performed in such an order as, starting from the broadcasting station A, the station B, the station C, the station D then to the station E. The old/new reception counter is added by one count (+1) uniformly at every time when the AF data are renewed through the operation of chasing the same broadcast program. In other words, the old-/new reception counter is a counter for designating an old and new history of the AF data, whereby the larger the values the older the AF data.

Figure 5:
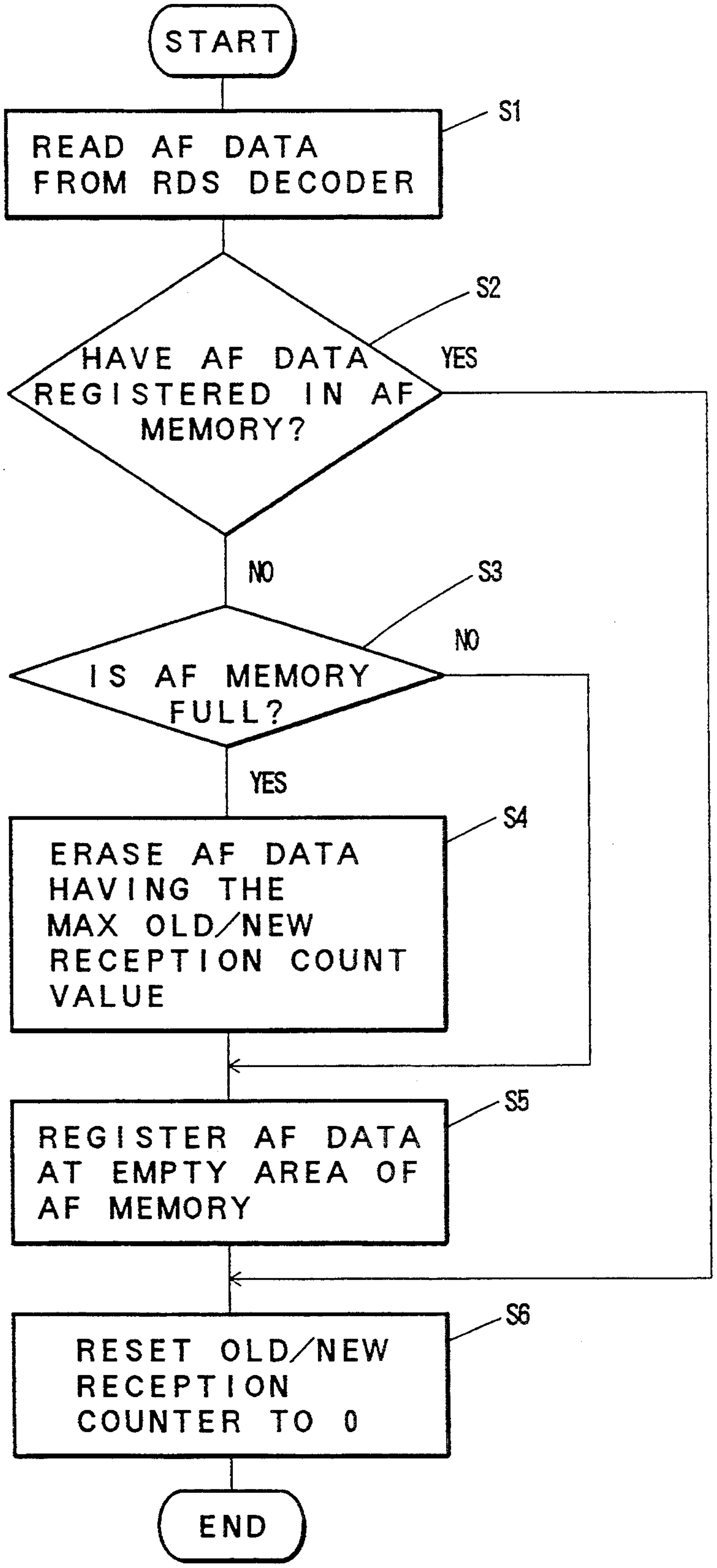
FIG. 5 is a flowchart showing operational steps for registering AF data to be implemented by a controller installed in the RDS receiver of FIG. 4.

In FIG. 5, upon initiation, AF data are read from the RDS decoder 9 at step S1. It is determined at step S2 whether or not the AF data has already been registered in the AF memory 11*a*. If it has, the program goes to step S6 and resets the old/new reception counter to 0, whereas if it has not, it is determined at step S3 whether or not the AF memory 11*a* is filled with the AF data. If it is not, the program goes to step S5 and the AF data are registered at an empty area of the AF memory 11*a*, hence, at step S6, a value of the corresponding old/new reception counter is reset to 0.

If it is determined at step S3 that there is no empty area in the memory 11*a* for registering the AF data, the AF data of the maximum old/new reception count value or the oldest AF data stored in the AF memory 11*a* is erased at step S4 and the program goes to step S5 and implementing the same steps thereafter as described above.

By implementing the operational steps as described above whenever the AF data is entered, the new AF data is registered on the AF memory 11*a*.

Another preferred embodiment of this invention will be described by referring to FIG. 6. It is further assumed that, besides the storing state of the AF memory 11*a* shown in FIG. 7A, stored are AF data $f_A$, $f_B$, $f_C$, $f_D$ ... at the true AF memory 11*b* of the memory 11 as shown in FIG. 7B, which data correspond to the frequencies of the actually received broadcast waves being broadcasted by the broadcasting stations during the operation of chasing the same broadcast program.

Upon initiation of the operational steps, the sound muting circuits 13 are turned on at step S7. At step S8, by receiving all broadcast waves the frequencies of which correspond to the all AF data stored in the true AF memory 11*b* and AF memory 11*a*, the most suitable broadcasting station for reception is determined based on received signal levels derived from the level detector 7 and station detection signals derived from the station detector 12. It is then determined at step S9 whether or not the received signal level of the broadcast wave broadcasted by the best broadcasting station, which is selected at step S8, is greater than that of the latest broadcasting station presently in contact. If it is not, the program goes to step S14 for receiving the broadcast wave from the latest broadcasting station, whereas, if it is, the broadcast wave of the best select broadcasting station is received at step S10. It is then checked at step S11 whether or not the program identification code (PI code) of the best select broadcasting station coincides with the stored PI code. If it is not, the program goes to step S14 for receiving the broadcast wave from the latest broadcasting station, whereas, if it is, the AF data that correspond to the best select broadcasting station are registered at the true AF memory 11*b* at step S12.

At step S13, the AF data already registered at the AF memory 11*a* are kept as they are, while, at step S15, every old/new reception count value in the AF memory 11*a* is added by one (+1). Finally, the sound muting circuits 13 are turned off at step S16. The receiving frequency by the RDS receiver for chasing the same broadcast program is now changed through the operational steps as described above.

As it is described above, when the program goes to step S14, the RDS receiver is forced to receive the broadcast wave broadcasted by the latest broadcasting station and the sound muting circuits are also turned off at step S16. In this case, the operational steps result in no implementation of the chasing operation for the same broadcast program and, accordingly, there will be no change in the receiving frequency of the RDS receiver.

Figure 1:
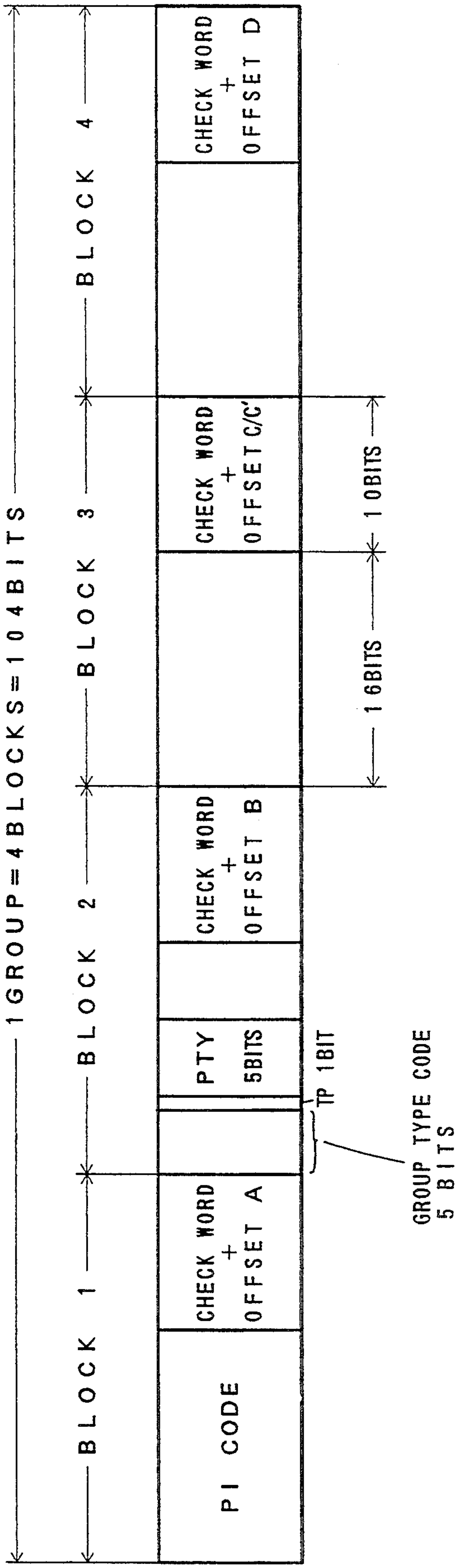
FIG. 1 is a diagram showing RDS data format.
Figure 2:
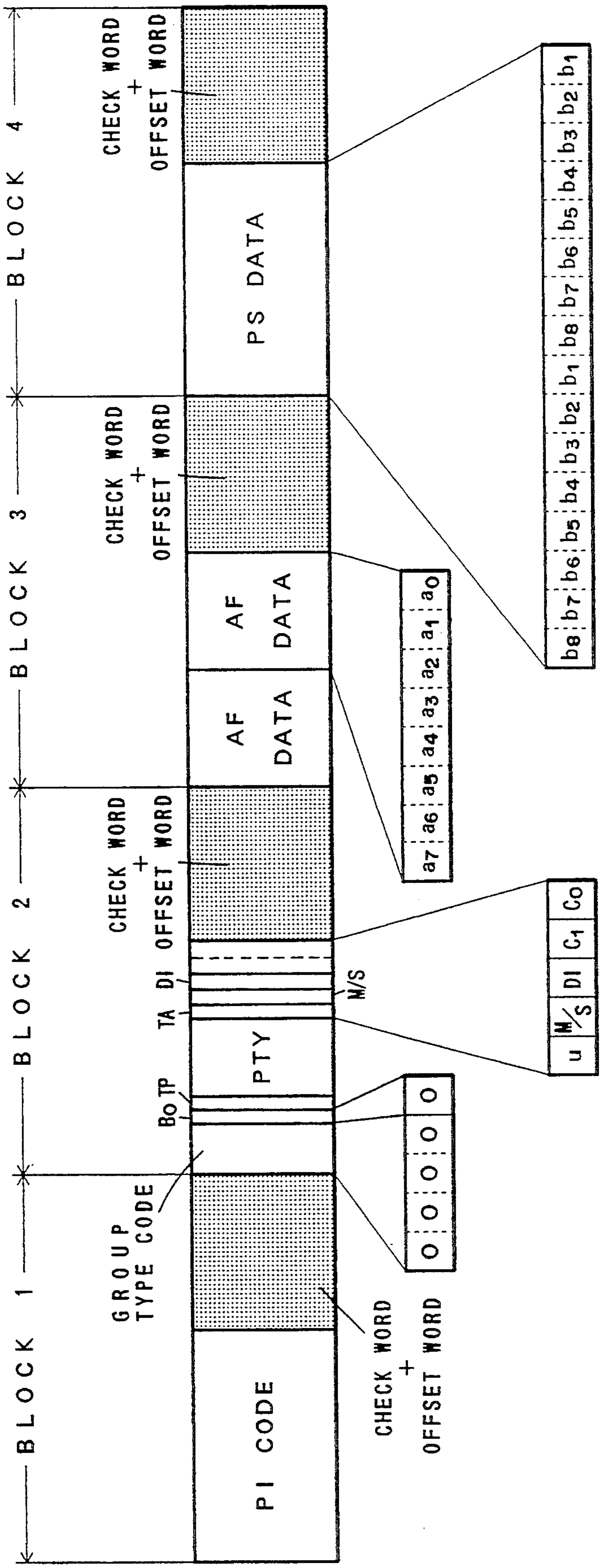
FIG. 2 is a diagram showing an example of the RDS data.
Figure 3:
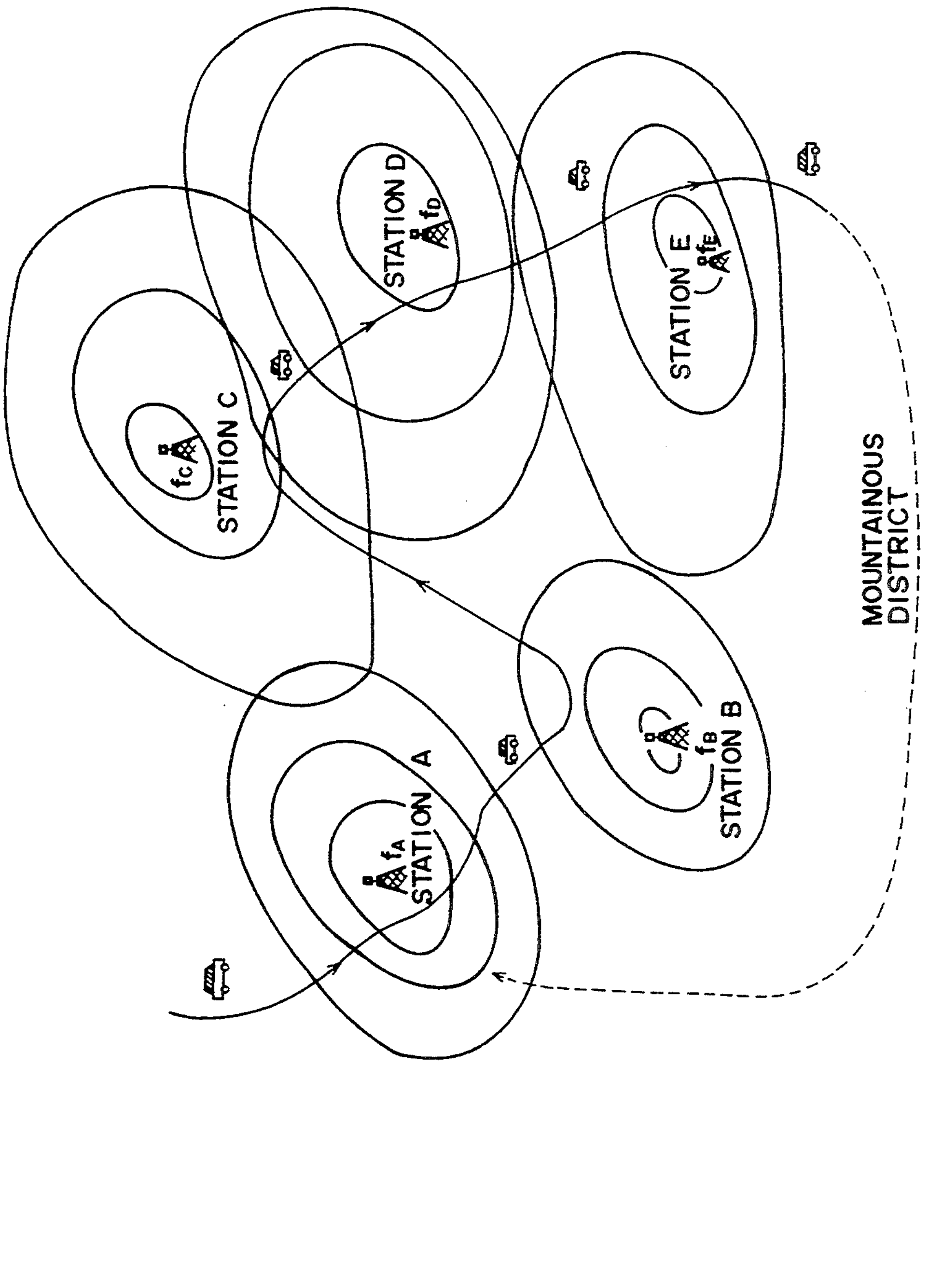
FIG. 3 is an illustrative map showing a change of frequencies along a route of traveling for receiving broadcast waves broadcasted by broadcasting stations which belong to the same broadcasting network.

As shown in FIG. 3, if the motor vehicle, which has selected the broadcasting station A when passing through the broadcasting service area thereof, returns to the broadcasting service area of the broadcasting station A after passing through the broadcasting service areas of the broadcasting stations B-C-D-E and the mountainous district and that the AF data for the broadcasting station A is not included in a group of the AF data transmitted by the broadcasting station E, it is possible for the motor vehicle-mounted RDS receiver to select the broadcasting station A through the operation of chasing the same broadcast program based on the fact that, as shown in FIG. 7B, the AF data $f_A$ for the broadcasting station A are stored in the AF memory 11*a* and/or TRUE AF memory 11*b*.

Figure 6:
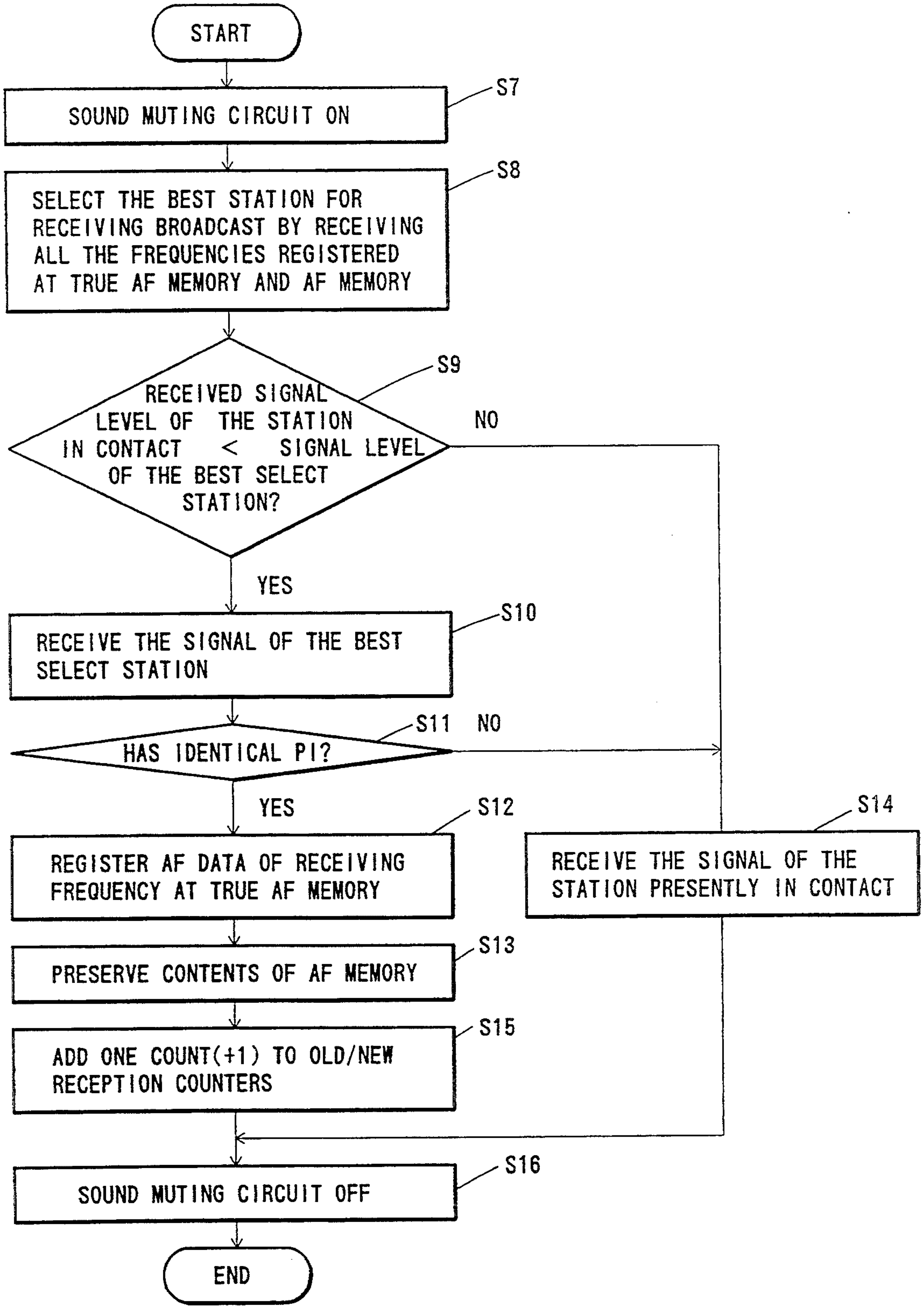
FIG. 6 is a flowchart showing operational steps for selecting broadcasting stations within the same broadcasting network to be implemented by the controller installed in the RDS receiver of FIG. 4.

In the embodiment shown in FIG. 6, the received signal levels of the most suitable broadcasting station are selected and the latest broadcasting station are compared to determine which is greater in signal level, however, the received signal level of the latest broadcasting station may be substituted for a predetermined signal level for providing the same advantages for the RDS receiver in the operation of chasing the same broadcast program.

As it has been described above, in accordance with this invention, at least a part of the list of alternative frequencies data transmitted by the broadcasting stations formerly in contact is stored in such a manner as to store newly obtained alternative frequencies data in preference to others and which stored alternative frequencies data are utilized in the next operation for chasing the same broadcast program. Therefore, even if the motor vehicle has left the broadcasting network area, it is possible for the RDS receiver to resume the operation for chasing the same broadcast program based on the stored list of alternative frequencies data upon returning to the same broadcasting area.

Further, in accordance with this invention, even if a part of stored list of alternative frequencies data must be erased as the storing area is filled with the alternative frequencies data of the broadcasting stations in contact, the oldest alternative frequencies data is erased and newly obtained alternative frequencies data is stored instead. Accordingly, the RDS receiver can afford to perform the operation for chasing the same broadcast program upon returning to the broadcasting network within which the RDS receiver has received the same broadcast program.

It is to be understood by those skilled in the art that the foregoing descriptions relate only to preferred embodiments of the invention and that various changes and modifications may be made in the invention without departing from the spirit and scope thereof.

What is claimed is:

1. A receiving frequency selecting method for a RDS receiver, comprising the steps of:

a) receiving, using an RDS receiver, a RDS signal broadcast from a first broadcast station at a first frequency, said RDS signal including a first group of alternative frequencies for a group of broadcasting stations in a broadcasting network which includes said first broadcast station, said receiver including a first memory for storing a list of alternative frequencies;

b) storing alternative frequencies of said first group, which are not in said list, in said first memory to create a new list of alternative frequencies; and c) chasing a broadcast program being broadcast by said broadcasting network by varying a receiving frequency of said RDS receiver to a frequency which corresponds to one of said alternative frequencies in said new list in order to maintain a receiving level at or above a prescribed receiving signal level or a signal level of said first broadcasting station.

2. The method of claim 1, wherein said first memory stores an age code associated with each alternative frequency in said list; and said step b) includes the steps of:

b1) determining which alternative frequencies in said list are in said first group;

b2) setting said age code to zero for each alternative frequency in said list which said step b1) determines is in said first group;

b3) incrementing said age code for each alternative frequency in said list which is not in said first group based on output of said step b1).

3. The method of claim 2, wherein when said first memory is full, said step b) replaces said alternative frequencies in said list associated with the largest age codes with the alternative frequencies of said first group which are not in said list.

4. The method of claim 1, wherein said step c) comprises the steps of:

c1) receiving all broadcast waves that correspond to said alternative frequencies in said new list, and c2) selecting one of said first frequency and said alternative frequencies received in step c1) having a largest signal level; and said step a) treats said selected frequency and corresponding broadcast station as said first frequency and said first broadcast station, respectively.

5. The method of claim 1, further comprising the step of:

d) storing said alternative frequencies in said first group in a second memory of said receiver; and wherein said step c) chases said broadcast program broadcast by said broadcasting network by varying a receiving frequency of said RDS receiver to a frequency which corresponds to one of said alternative frequencies in said new list and said alternative frequencies stored in said second memory in order to maintain a receiving level at or above a prescribed receiving signal level or a signal level of said first broadcasting station.

6. The method of claim 5, wherein said first memory stores an age code associated with each alternative frequency in said list; and said step b) includes the steps of:

b1) determining which alternative frequencies in said list are in said first group;

b2) setting said age code to zero for each of the alternative frequencies in said list which said step b1) determines are in said first group;

b3) incrementing said age code for each alternative frequency in said list which is not in said first group based on output of said step b1).

7. The method of claim 6, wherein when said first memory is full, said step b) replaces said alternative frequencies in said list associated with the largest age codes with the alternative frequencies of said first group which are not in said list.

8. The method of claim 5, wherein said step c) comprises the steps of:

c1) receiving all broadcast waves that correspond to said alternative frequencies in said new list and stored in said second memory, c2) selecting one of said alternative frequencies received in step c1) having a largest signal level, c3) determining whether said selected alternative frequency has a larger signal level than a signal level of said first frequency, and c4) determining, when said selected alternative frequency has a larger signal level than said signal level of said first frequency, if a program code of a signal transmitted at said selected alternative frequency equals a program code of a signal transmitted at said first frequency; and said step a) treats said selected frequency and corresponding broadcast station as said first frequency and said first broadcast station, respectively, when said step c4) indicates that said program code of said signal transmitted at said selected alternative frequency equals said program code of said signal transmitted at said first frequency.

9. A receiving frequency selecting apparatus for a RDS receiver, comprising:

RDS receiving means receiving a RDS signal broadcast from a first broadcast station at a first frequency, said RDS signal including a first group of alternative frequencies for a group of broadcasting stations in a broadcasting network which includes said first broadcast station;

a first memory for storing a list of alternative frequencies, and for storing alternative frequencies of said first group, which are not in said list, to create a new list of alternative frequencies; and control means for chasing a broadcast program being broadcast by said broadcasting network by varying a receiving frequency of said receiving means to a frequency which corresponds to one of said alternative frequencies in said new list in order to maintain a receiving level at or above a prescribed receiving signal level or a signal level of said first broadcasting station.

10. The apparatus of claim 9, wherein said first memory stores an age code associated with each alternative frequency in said list; and said control means determines which alternative frequencies in said list are in said first group, controls said first memory to set said age code to zero for each alternative frequencies in said list which is in said first group, and controls said first memory to increment said age code for each alternative frequency in said list which is not in said first group.

11. The apparatus of claim 10, wherein when said first memory is full, said control means controls said first memory to replace said alternative frequencies in said list associated with the largest age codes with the alternative frequencies of said first group which are not in said list.

12. The apparatus of claim 9, wherein said control means controls said receiving means to receive all broadcast waves that correspond to said alternative frequencies in said new list, selects one of said first frequency and said received alternative frequencies having a largest signal level, and controls said receiving means to treat said selected frequency and corresponding broadcast station as said first frequency and said first broadcast station, respectively.

13. The apparatus of claim 9, further comprising:

a second memory storing said alternative frequencies in said first group; and wherein said control means chases said broadcast program broadcast by said broadcasting network by varying a receiving frequency of said RDS receiving means to a frequency which corresponds to one of said alternative frequencies in said new list and said alternative frequencies stored in said second memory in order to maintain a receiving level at or above a prescribed receiving signal level or a signal level of said first broadcasting station.

14. The apparatus of claim 13, wherein said first memory stores an age code associated with each alternative frequency in said list; and said control means determines which alternative frequencies in said list are in said first group, controls said first memory to set said age code to zero for each alternative frequency in said list which is in said first group, and controls said first memory to increment said age code for each alternative frequency in said list which is not in said first group.

15. The apparatus of claim 14, wherein when said first memory is full, said control means controls said first memory to replace said alternative frequencies in said list associated with the largest age codes with the alternative frequencies of said first group which are not in said list.

16. The apparatus of claim 13, wherein said control means controls said receiving means to receive all broadcast waves that correspond to said alternative frequencies in said new list and to said alternative frequencies stored in said second memory, selects one of said received alternative frequencies having a largest signal level, determines whether said selected alternative frequency has a larger signal level than a signal level of said first frequency, determines, when said selected alternative frequency has a larger signal level than said signal level of said first frequency, if a program code of a signal transmitted at said selected alternative frequency equals a program code of a signal transmitted at said first frequency, and controls said receiving means to treat said selected frequency and corresponding broadcast station as said first frequency and said first broadcast station, respectively, when said program code of said signal transmitted at said selected alternative frequency equals said program code of said signal transmitted at said first frequency.

* * * * *